United States Patent
Mower et al.

(10) Patent No.: US 8,763,084 B2
(45) Date of Patent: *Jun. 24, 2014

(54) NETWORKING AS A SERVICE

(75) Inventors: Carl Steven Mower, Sunnyvale, CA (US); Matthew Alan Palmer, Menlo Park, CA (US); Steven Couch Mayhew, Cupertino, CA (US)

(73) Assignee: Aerohive Networks, Inc., Sunnyvale, CA (US)

(*) Notice: Subject to any disclaimer, the term of this patent is extended or adjusted under 35 U.S.C. 154(b) by 69 days.

This patent is subject to a terminal disclaimer.

(21) Appl. No.: 13/603,272

(22) Filed: Sep. 4, 2012

(65) Prior Publication Data
US 2012/0331524 A1    Dec. 27, 2012

Related U.S. Application Data

(63) Continuation of application No. 12/357,390, filed on Jan. 21, 2009, now Pat. No. 8,347,355.

(60) Provisional application No. 61/021,883, filed on Jan. 17, 2008.

(51) Int. Cl.
*H04L 29/06* (2006.01)

(52) U.S. Cl.
USPC ............................................ 726/3

(58) Field of Classification Search
USPC ........... 726/3, 9; 713/153, 168, 176; 709/220, 709/226
See application file for complete search history.

(56) References Cited

U.S. PATENT DOCUMENTS

| | | | | |
|---|---|---|---|---|
| 5,832,503 | A * | 11/1998 | Malik et al. | 709/223 |
| 5,872,928 | A | 2/1999 | Lewis et al. | |
| 6,011,910 | A * | 1/2000 | Chau et al. | 709/229 |
| 6,799,272 | B1 * | 9/2004 | Urata | 713/171 |
| 7,131,141 | B1 | 10/2006 | Blewett et al. | |
| 7,207,061 | B2 * | 4/2007 | Martin | 726/11 |
| 7,461,158 | B2 | 12/2008 | Rider et al. | |
| 7,499,438 | B2 * | 3/2009 | Hinman et al. | 370/338 |
| 7,546,632 | B2 * | 6/2009 | Stieglitz et al. | 726/3 |
| 7,751,392 | B1 | 7/2010 | Gonzalez et al. | |
| 7,865,557 | B2 * | 1/2011 | Tomkow | 709/206 |
| 7,865,577 | B1 | 1/2011 | O'Neil et al. | |
| 7,865,727 | B2 * | 1/2011 | Zeng et al. | 713/168 |
| 8,447,843 | B2 * | 5/2013 | Johnson et al. | 709/220 |
| 2002/0194369 | A1 | 12/2002 | Rawlins et al. | |
| 2003/0009689 | A1 * | 1/2003 | Kolb | 713/201 |
| 2003/0048750 | A1 | 3/2003 | Kobayashi | |
| 2003/0055935 | A1 * | 3/2003 | Tarrant et al. | 709/223 |
| 2003/0074429 | A1 | 4/2003 | Gieseke et al. | |
| 2003/0117951 | A1 | 6/2003 | Wiebe et al. | |
| 2003/0120624 | A1 | 6/2003 | Poppenga et al. | |
| 2003/0212775 | A1 | 11/2003 | Steele et al. | |
| 2003/0212908 | A1 | 11/2003 | Piesco | |

(Continued)

*Primary Examiner* — Ali Abyaneh
(74) *Attorney, Agent, or Firm* — Sheppard, Mullin, Richter & Hampton LLP

(57) ABSTRACT

Networking as a Service (NaaS) delivers network services using remote appliances controlled by a hosted, multi-tenant management system. The system may include a heartbeating process for communication between a web-based server and appliances, in which the appliances periodically contact the management system on the server. The heartbeating process allows the appliances to maintain a completely up-to-date configuration. Furthermore, heartbeating allows for comprehensive monitoring of appliances and for software distribution. The system may also include means for authenticating appliances, without the need for pre-installed PSKs or certificates.

19 Claims, 8 Drawing Sheets

(56) References Cited

U.S. PATENT DOCUMENTS

| | | |
|---|---|---|
| 2004/0098472 A1 | 5/2004 | Styles et al. |
| 2004/0205201 A1* | 10/2004 | Katsube et al. ............... 709/229 |
| 2004/0233234 A1 | 11/2004 | Chaudhry |
| 2005/0192969 A1 | 9/2005 | Haga et al. |
| 2005/0246346 A1* | 11/2005 | Gerdes et al. .................. 707/10 |
| 2006/0167988 A1 | 7/2006 | Barck et al. |
| 2006/0200856 A1* | 9/2006 | Salowey et al. ................... 726/5 |
| 2006/0236093 A1 | 10/2006 | Brok et al. |
| 2007/0043860 A1 | 2/2007 | Pabari |
| 2007/0136804 A1* | 6/2007 | Ohsawa et al. ................. 726/14 |
| 2007/0274285 A1 | 11/2007 | Werber et al. |
| 2008/0002823 A1 | 1/2008 | Fama et al. |
| 2008/0043627 A1 | 2/2008 | Singh et al. |
| 2008/0046995 A1 | 2/2008 | Satterlee et al. |
| 2009/0052338 A1* | 2/2009 | Kelley et al. .................. 370/250 |
| 2009/0112734 A1 | 4/2009 | Viehmann et al. |
| 2009/0164579 A1* | 6/2009 | Chaudhry ..................... 709/205 |
| 2009/0276530 A1 | 11/2009 | Gentry et al. |
| 2009/0296604 A1 | 12/2009 | Karaoguz et al. |
| 2009/0327398 A1* | 12/2009 | Campbell et al. ............. 709/202 |
| 2010/0218104 A1 | 8/2010 | Lewis |

\* cited by examiner

NETWORKING AS A SERVICE

CROSS-REFERENCE TO RELATED APPLICATIONS

This application is a continuation of U.S. Ser. No. 12/357,390, filed Jan. 21, 2009, entitled "NETWORKING AS A SERVICE: DELIVERING NETWORK SERVICES USING REMOTE APPLIANCES CONTROLLED VIA A HOSTED, MULTI-TENANT MANAGEMENT SYSTEM," which claims priority to U.S. Provisional Patent Application No. 61/021,883, filed Jan. 17, 2008, entitled "NETWORKING AS A SERVICE: DELIVERING NETWORK SERVICES USING REMOTE APPLIANCES CONTROLLED VIA A HOSTED, MULTI-TENANT MANAGEMENT SYSTEM," both of which are incorporated by reference.

BACKGROUND

Many organizations have locations where there are limited or no IT staff to maintain and operate network equipment. Current solutions often require expensive on-site staff; service contracts with local expert contractors; and/or investment in expensive remote network management and monitoring software, systems, or services. Additionally, current solutions allow an administrator to make changes to the network in multiple places like a CLI, Web-GUI, or network management system—for which there is no good way to synchronize changes from each place where changes occur. There is a need for lower cost, more efficient solutions for providing network services.

In order to set-up and run a computer network, many organizations face the challenges of: building a server and installing and configuring vendor software to manage network devices; and installing, configuring, and maintaining a network management appliance. furthermore, many organizations desire, but do not have access to solutions that allow: people from multiple domains, virtual networks, or companies to operate different portions of the network management software; and support of 10,000+ devices. There is a need for network management applications that provide solutions to these software challenges.

Since network administrators can change a device's configuration settings both locally on the device and at the network management station, the actual configuration of a device can differ from that intended by the management station. Additionally, because of Network Address Translation (NAT), some devices cannot be reached when communication is initiated by the management station. There is a need for a solution to overcome these communication issues that affect network integrity.

Most networking solutions today require the networking device to be reachable when communication is initiated from the management station. They also typically allow changes to be made both at the management station and at the networking device itself. Because of this, not all networking topologies are possible, and the actual networking device's configuration can "morph out from under" the management station's expectation of that device's settings. There is a need for solutions that provide greater flexibility in network topology and greater predictability.

Network Address Translation (NAT) enables a LAN to use one set of IP addresses for internal traffic and a second set for external traffic. Because of NAT, some devices cannot be reached when communication is initiated by the management station, since the addresses for internal traffic may be hidden from the management station. Most networking solutions today require the networking device to be reachable when communication is initiated from the management station. There is a need to overcome this communication barrier between the management station and networking devices.

Network Administrators spend a lot of time just keeping-up on all the possible versions of operational software available for a piece of networking gear. There is a need to provide network administrators with a simpler and more efficient software solution. Even worse, there is a continual flow of maintenance and security patches each month. There is a need to simplify this maintenance process.

Home users often need networking devices issued by their employer in order to work from home, but their employer does not find it cost-effective to send a technician to the employees' home to configure the networking device. Employers also do not wish to spend time stocking those networking devices at the office and pre-configuring them on a per-unit basis before sending them home with their employees. Some networking vendors have implemented configuration servers which store one configuration for each networking device to be deployed, but even in such solutions, the configurations are associated with the networking device, rather than the end-user making use of that networking device. There is a need for a more efficient, cost effective method for employers to provide their employees with networking devices for home-use.

Authenticating a networking device to a Web server often involves some key material being pre-installed on the device, such as a certificate, or pre-shared key (PSK). There is a need for efficient methods of performing authentication, authorization and accounting (AAA) on an insecure device—without a pre-installed PSK or similar.

DETAILED DESCRIPTION

Figure 1:
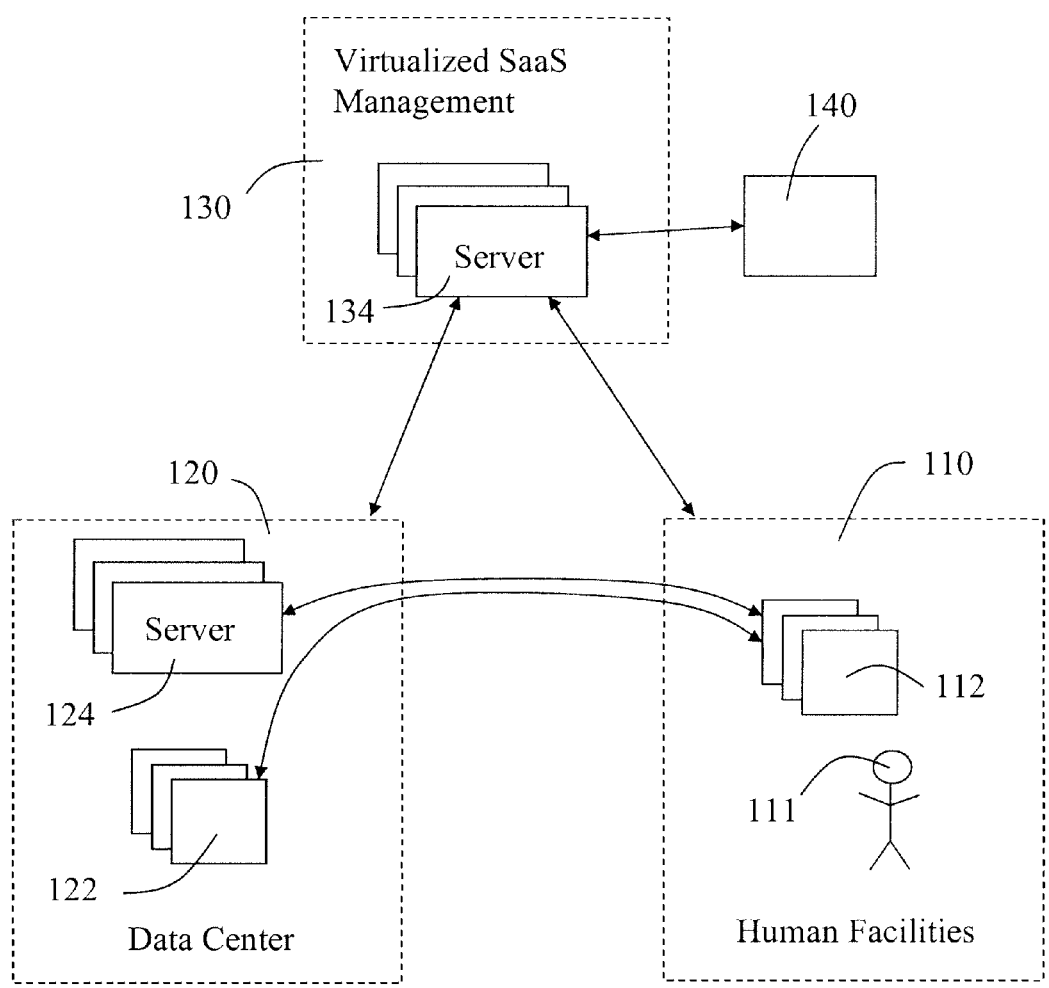
FIG. 1 illustrates networking as a service.

Embodiments will now be described in detail with reference to the drawings, which are provided as illustrative examples so as to enable those skilled in the art to practice the invention. Notably, the figures and examples below are not meant to limit the scope of the invention to a single embodiment; other embodiments are possible by way of interchange of some or all of the described or illustrated elements. Moreover, where certain elements of an embodiment can be partially or fully implemented using known components, only those portions of such known components that are necessary for an understanding of the invention might be described, and detailed descriptions of other portions of such known components may be omitted so as not to obscure the described embodiment. In the present specification, an embodiment showing a singular component should not be considered limiting; rather, the invention is intended to encompass other embodiments including a plurality of the same component, and vice-versa, unless explicitly stated otherwise herein. Applicants do not intend for any term in the specification or claims to be ascribed an uncommon or special meaning unless explicitly set forth as such. Embodiments encompass present and future known equivalents to the known components referred to herein by way of illustration.

A technique includes building network appliances (routers, firewalls, VPN, WAN Optimization, Switching, WLAN Access point, etc) that may have no command line interpreter (CLI)—a text-based input-output method implemented on most networking devices—or Web-GUI and may only be configured, managed, and updated via the appliance calling "home" via a secured Web-service over the Internet on a periodic basis, such as every minute. The model of appliances described herein using web services for remote management via a hosted multi-tenant system could apply to any internet connected special purpose appliances where automated management is important. Anything from internet connected search appliances to internet connected refrigerators.

Networking as a Service (NaaS) allows the device to be remotely controlled over the Internet without the need for a person on site to configure or manage the appliance. In addition the only way a person can make moves, adds, or changes to the network is through the hosted web services—making the web service a "system of record" improves security, control, and standardization of configuration of large numbers of devices. This is a management system that can scale to manage 10 k, 100 k, or 1M+ remote appliances.

NaaS virtualizes the network, enabling a customer to accelerate information technology innovation using an agile infrastructure, while reducing networking costs. Important components of a NaaS solution are: a subscription service business model that provides a lower cost solution than traditional network solutions; an application development platform that links network settings to business requirements; a configurations database with automated and virtualized support for each appliance function, configuration file and setting; virtualized SaaS-based management to speed deployment and increase control and standardization of branch networks; and virtualized network appliances that are dynamically configured to be integrated routing, security, VPN and WAN optimization appliances, with the option to include LAN, WLAN, and AFE.

NaaS allows delivery of network equipment to customers as a self-managed service, instead of an equipment purchase that requires significant software integration and operational labor or software. By offering NaaS, the service provider can reduce the customer's non-bandwidth networking expense (equipment, software, & labor) by a factor of 5×-10×, depending on the size and complexity of the network, while generating gross margins comparable to current network equipment margins.

Key aspects of the NaaS business model may include the following. NaaS may be implemented as a subscription based service. For example, customers "subscribe" to a network where they pay a monthly fee (invoiced annually, perhaps) based on the number of networking devices and functionality used. Customer business benefits include: pay as you go (or use); no hardware depreciation costs; and no annual software maintenance fees.

NaaS bypasses traditional networking distribution. With NaaS, the networking solution is sold directly via inside sales to small/medium sized customers; and direct sales (pre-qualified via inside sales) are made to large customers. The product is drop shipped to the customer via Fedex or UPS, for example, with inventory management and logistics outsourced to retail companies such as Amazon. After some initial customer traction, there may also be a potential opportunity to leverage non-networking IT channels, such as MSFT channel, application developers and SIs, etc.

NaaS provides a hosted management infrastructure. NaaS hosts the management infrastructure at authorized data centers, where each customer's data is encrypted and secured from other customers. A customer benefit is the option to delegate management for all or part of the NaaS network to third parties. Two examples of this are provided. Car Company has the option to manage and control a minimal level of security required for dealer networks to connect to Car Company directly. Car Company dealers can manage the rest of the devices (or manage remaining devices on their own). Global Insurance Company can outsource network configuration options to a virtual network operator (VNO) while retaining security configuration responsibilities internally. This capability will enable new types of partners and applications to interact with the network to automate workflows and business processes—potentially creating new distribution models.

NaaS as a self-service model. Instead of requiring networking experts to design, install, monitor, and manage the network, organizations can self-manage their network with non-expert personnel who can access their NaaS-managed devices with a web browser anywhere in the world. This is made possible by the simplified network configuration options and automated installation and configuration process of NaaS.

NaaS allows the use of commodity hardware, multi-core software, and virtual machines. Standard off-the shelf appliances with multi-core capable software and virtual machines may be used to deliver broad network functionality with acceptable levels of reliability.

NaaS may be enhanced with inclusive product design. A NaaS provider may build and control the hardware, software, configuration options, and management infrastructure to ensure compatibility, reliability, and configuration.

NaaS permits customer to control delegation of operation. Customers control who can access their NaaS configuration, creating opportunity for new customers to enable new channels to operate and manage the devices.

NaaS may be tightly integrated with Web 2.0 Applications to drive additional value. As a first example, enable XML based API to share data and automate NaaS management. As a second example, integrate with Google Domains and Applications to enable customers to manage internal and external DNS within a single application. Other examples could include: social networking (find people who can manage a NaaS); compare best practices for NaaS deployment; and integrate with SaaS network monitoring applications like Splunk or open source network management applications such as IT Groundworks to integrate with existing network infrastructures. Note that since embodiments include control and monitoring of networking devices via software running on Internet servers, ("in the cloud"), data from other Web servers can easily be integrated with monitoring data to add new value. This holds equally true for data on servers not resident on the general Internet, but in a company's private intranet. For example, a customer that uses Splunk to collect log data from a variety of their other networking devices and servers could combine Web-accessible logs and statistics with those logs to deduce new insights that otherwise would not be possible.

Some benefits of embodiments over the state of the art may include: increased control of the network, network appliances, and network services; increased security via standardization; increased business flexibility—the customer can repurpose, that is re-use the networking device for a different purpose or task the appliances based on business need with a click of a web service interface); increase speed, ease of deployment, and execution; increased simplification, for example 1 way vs. 3 to control a device, which may also be limited to pre-tested configurations; increased reliability; and 5× to 10× cost reduction for the customer.

FIG. 1 shows an implementation of NaaS for a branch-office type solution. Human facilities 110 are connected to a data center 120 via any wide-area networking technology. The human facilities comprise networking devices 112 which allow end users 111 to access the network. The human facilities 110 may be telecommuters, a temporary business location, or a branch office. The data center 120 comprises devices 122 and servers 124. The data center 120 and human facilities 110 are connected via the Internet to a virtualized software as a service (SaaS) management center 130. The virtualized SaaS management center 130 comprises servers 134. The virtualized SaaS management center 130 may be integrated with business applications 140 for automated management of network devices.

A NaaS solution includes: (1) discover local devices, network services and an uplink carrier; (2) configure a network using a business wizard and a library of proven and tested network configurations; (3) form and maintain a secure network; and (4) automatically monitor networking devices using a heartbeat process, including auto-upgrades of software. These are discussed in detail below.

NaaS Simplifies Networking

One reason that traditional solutions are complex is that there are many versions of code that can run on each networking device making for thousands of potential combinations. NaaS greatly simplifies this by ensuring each device is running one and only one version of software, thus making only one combination to test. Having only one version of software on the hub, one version on the CPE, and one version of the management service provides an on-going sustainable advantage. To facilitate this single version of code solution, the following may be used: databases of tested working solutions for business problems—see co-pending application entitled Virtualization of Networking Services, inventors Carl Steven Mower and Matthew Alan Palmer, filed Jan. 21, 2009, incorporated by reference herein; and expand application integration—for example, use XML API to integrate the network with business applications.

NaaS Solutions are Easily Adapted

NaaS solutions are very easily modified at several different levels of the system, shown here:

Delivering Network Management Applications as a Multi-Tenant Hosted Software as a Service Embodiments provide for developing, designing, and delivering network management software applications from a multi-tenant software as a service model using Web services that are distributed across the internet; to provide network management applications to multiple organizations or companies. Network management functions are provided via a series of Web pages which allow users to configure and monitor networking devices. The actual re-configuration of the networking devices, and collection of performance statistics occurs via a separate Web-based services, as described below.

Figure 2:
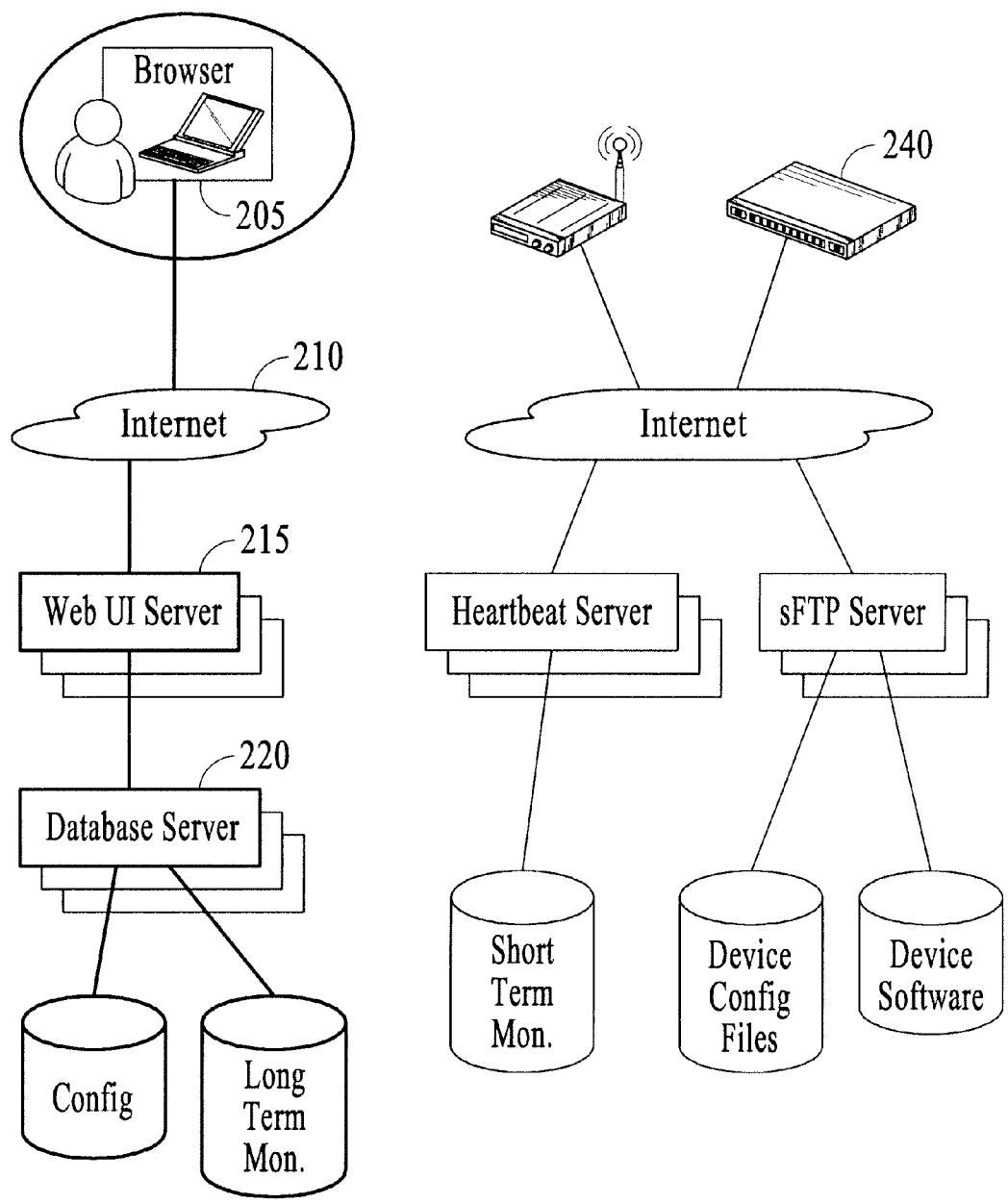
FIGS. 2 through 6 illustrate various aspects of delivering network management as a multi-tenant hosted software as a service.

The process for delivering network management applications is shown in FIGS. 2-6. In FIG. 2 the NaaS user views, and may edit, configuration and/or monitoring data. The user 205 logs in to the network, via the Internet 210, and is authenticated using a standard protocol, such as: a username and password; the user's company's AD/LDAP, provided by the hub 240 at their DMZ (a computer host or small network inserted as a "neutral zone" between a company's private network and the outside public network); and a secure-ID token. Web pages are served from the Web UI server 215 in a stateless fashion. All states are maintained in the database server 220.

Note that the network shown in FIG. 1 and the networks shown in FIGS. 2-6 are equivalent. For example, all of the servers shown in FIGS. 2-6 are equivalent to pieces of the server 134 in FIG. 1.

Figure 3:
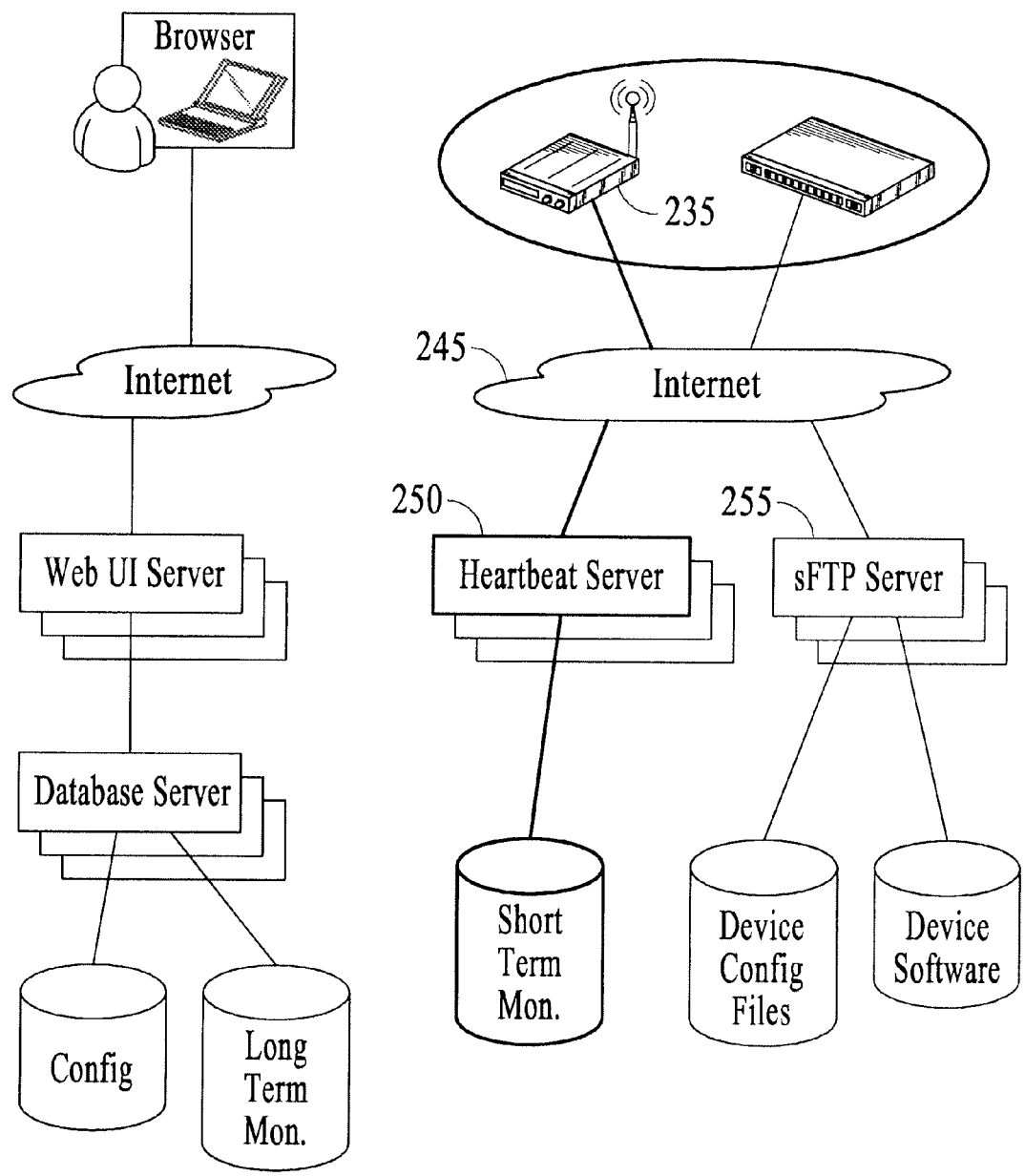

In FIG. 3, the heartbeat process is illustrated. The heartbeat process is a method of communication between a networking device 235 and a network management server 250, otherwise known as the heartbeat server, via the Internet 245. Every minute, each networking device (CPE) 235 sends one packet to the heartbeat server 250, the packet containing: all logs since the last, acknowledged, heartbeat (communication). The heartbeat server 250 accepts the data and responds with one packet containing a UID of a configuration file that the networking device 235 should be running; and build number (s) of software image(s) that the device 235 should be running. The response packet from the heartbeat server 250 is implicitly an acknowledgement that the logs and performance data have been accepted, so that the CPE 235 purges those values from its RAM. If the CPE 235 is not running the latest configuration or software image(s), it fetches them via a secure

TABLE I

Modification of NaaS Solutions

| Type of Change | Example: | Change made by: | Development Type & Schedule |
|---|---|---|---|
| Customer Configuration Settings | Change IP Sec or WEP Security Keys | Customer's IT staff for customer specific instance | On - demand 1-5 minutes |
| Security Content | New virus signature available | Network service provider's operations staff, all customers receive at once | On - demand 1-8 hours |
| Configuration Templates | New network configuration template | Network service provider's operations staff, all customers receive at once | On - demand 1-4 days |
| Web Service Functionality | Surface to customer's IT staff a template setting that previously had been hard-coded | Network service provider's operations staff, all customers receive at once | Scheduled Update 1-2 weeks |
| CPE & Hub Functionality | Add IPv6 or WAN Optimization | Network service provider's operations staff, all customers receive at once | Scheduled Update 4-6 weeks | transport method, such as sFTP or SSL, from the server 255. Note that the networking devices 235 are remotely upgraded with no action taken by any user(s) connected to that device. Furthermore, note that the networking devices 235 are conveying their log entries and monitored statistics to the heartbeat server 250 on each heartbeat. Centralizing the collection and storage of this data aids the customer in meeting government compliance and regulatory requirements, and frees them from implementing infrastructure to save this data on their own.

Figure 4:
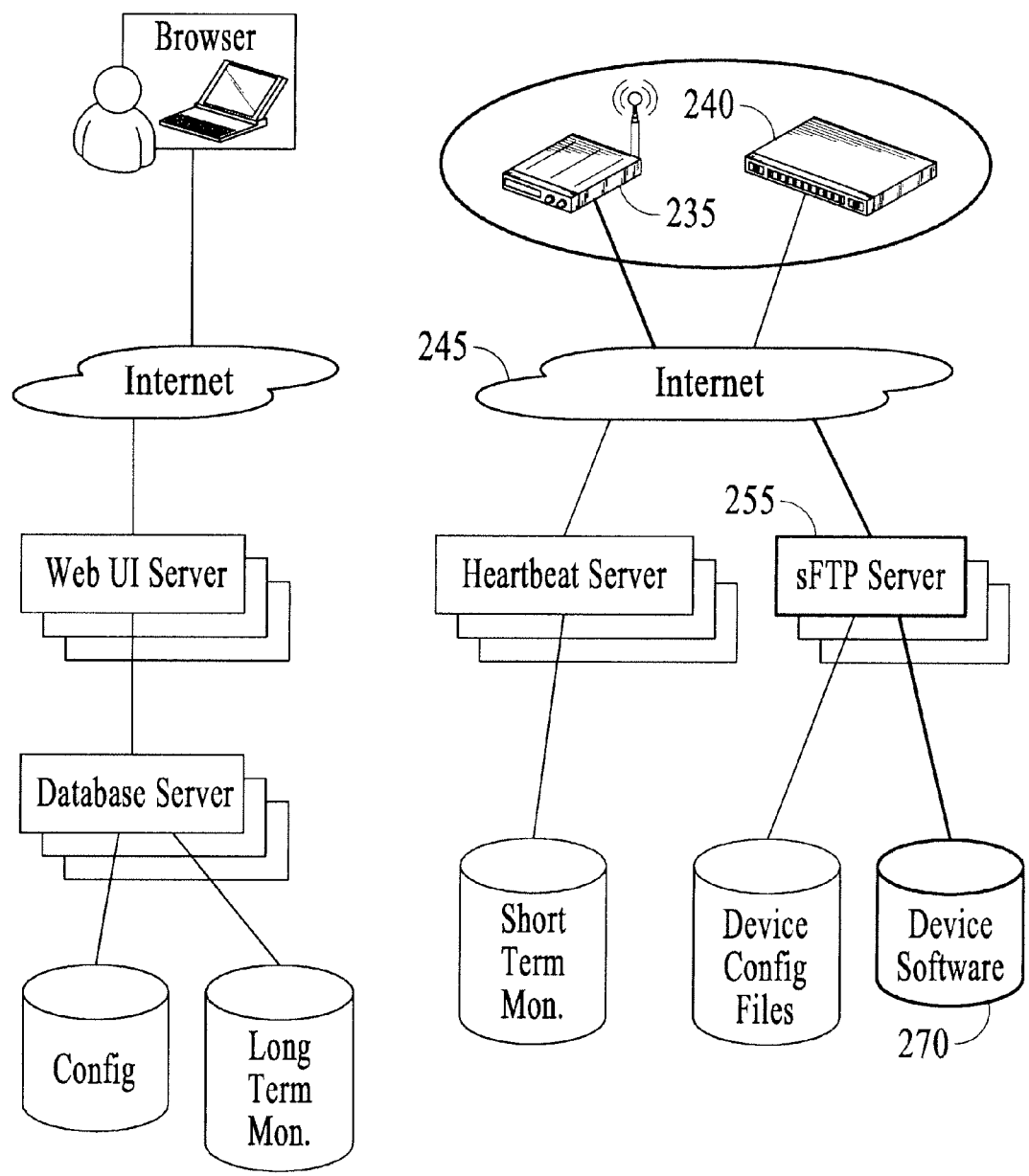

In FIG. 4, the networking device image upgrade process is illustrated. If the last heartbeat returns a newer build number than it is currently running, then the networking device 235 registers that it is running "stale" code. The networking device 235 slowly fetches, via a secure transport method, a newer image. A delay in fetching the image is intentionally added between each block fetched, so as to not saturate the limited WAN link. The device 235 burns the image into one of two non-volatile ram or hard-drive partitions on the device for active software, (the partition not holding the currently running image). On the next reboot, the device 235 reboots into the new partition. If the image does not successfully receive a heartbeat reply in the first five minutes, it reverts to the older image. If that backup/older image likewise does not receive a reply, a third "emergency" partition is booted which contains a "safe"/simple boot image that merely copies a "safe" image from the server 255, stored in a device software data base 270, and boots it. This process may be used similarly to upgrade the hub 240.

Figure 5:
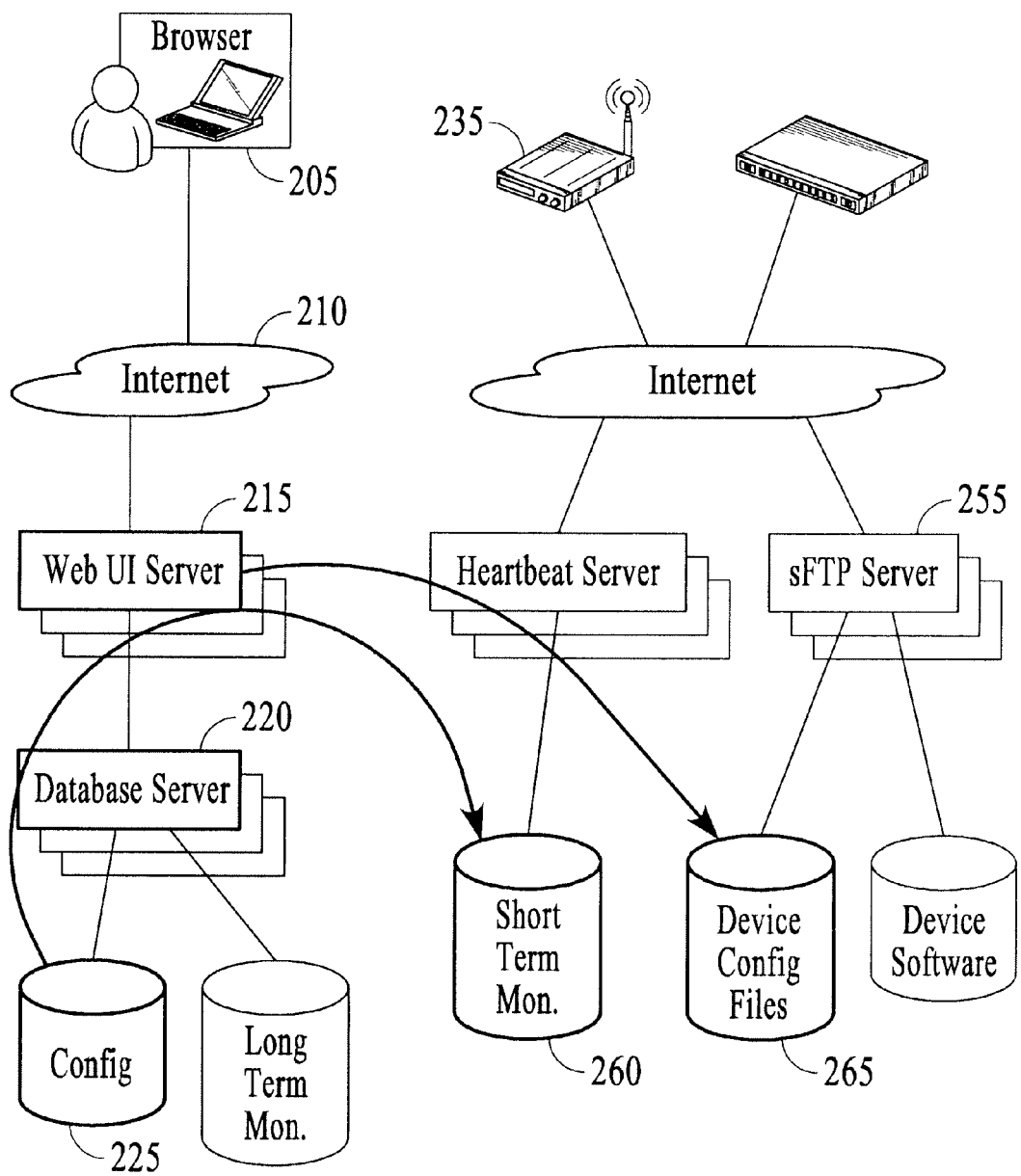

FIG. 5 illustrates the process of the user 205 publishing a modified configuration, stored in the configuration database 225, to the networking device(s) 235. The user 205 instructs the system to "publish" a modified configuration through a web page on the user's browser. The Web UI server 215 generates the actual unique configuration file for each affected device. The Web UI server 215 copies those new configurations to each of the servers 255, where the configurations are stored in the short term monitoring database. The Web UI server 215 updates the heartbeat server's short term monitoring database 260 with the UID of those new configurations for each affected device. On the next heartbeat, the affected devices will receive that new UID for their configuration file, and recognizing they have a "stale" configuration, will fetch the new configuration file via a secure transport method, such as sFTP or SSL. Within approximately five minutes, each affected device may be running the newly published configuration.

Figure 6:
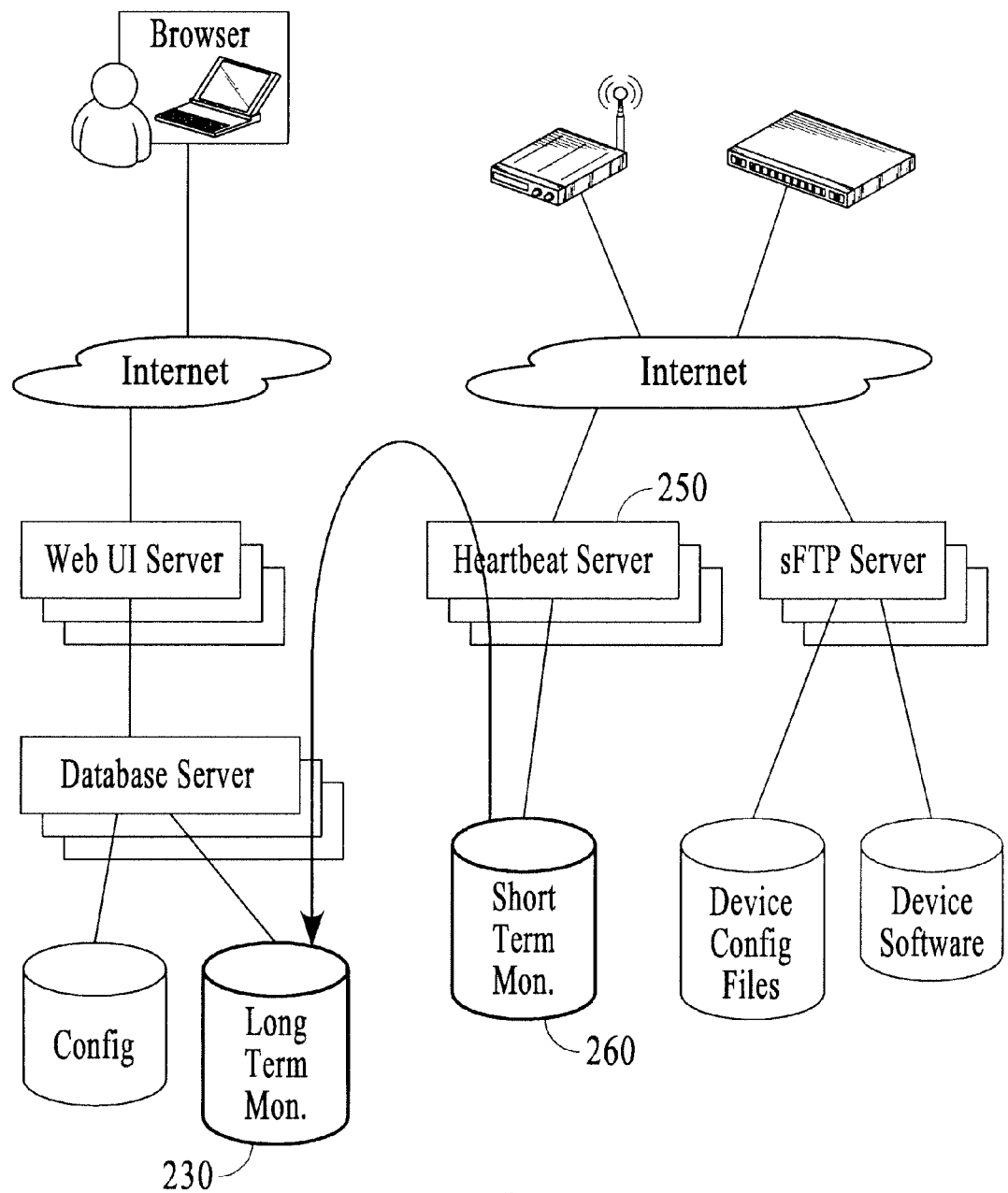

In FIG. 6, the process of collecting network device statistics is illustrated. The heartbeat servers 250 distill and push data to the long-term database 230 from the short-term databases 260, every minute or so.

Using the method of delivering network management applications described above allows: multiple organizations to leverage the same infrastructure; applications to be hosted and maintained at multiple locations on the internet for redundancy; multiple parties to access the network management application to operate/control specific groups of appliances across multiple organizations and security boundaries; access to Web Services API via the internet to develop addition network management applications. This method of network management is readily scalable to large numbers of parties and devices and is more scalable than prior art methods of network management.

Heartbeating

Figure 7:
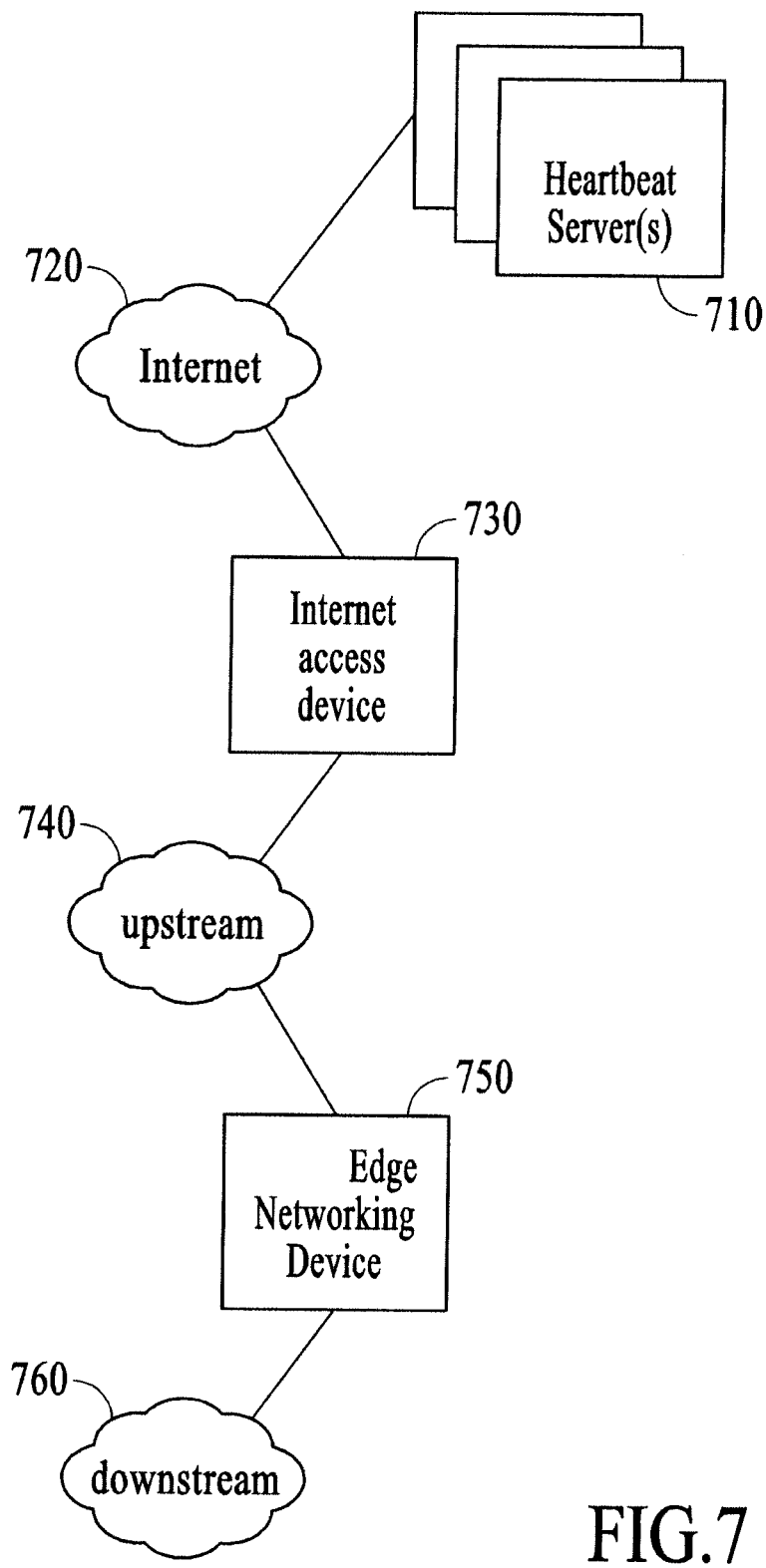
FIG. 7 shows networking components used in a heartbeating process.

A key implementation aspect of a NaaS solution is the general process of networking devices "heartbeating" to the Web-based servers. FIG. 7 shows components involved in the heartbeat process. The heartbeat servers 710, such as Pareto heartbeat servers, may be generic CPUs running proprietary code. The hardware for these servers is not proprietary—any type of hardware or operating system can be used. The heartbeat servers 710 are connected to the Internet 720. A branch/home Internet access device 730 is used to connect the branch/home location to the Internet 720. For example, the internet access device 730 may be a DSL or cable modem. Upstream branch/home networking devices 740 are optional networking or computing devices positioned between the Internet access device 730 and the networking device 750. The networking device 750, such as an Edge networking device, is located at the branch/home location. Downstream branch/home networking devices 760 are optional networking or computing devices connected directly or indirectly to the networking device 750, excluding the Internet access device 730 and any upstream networking devices 740.

In embodiments, the heartbeating process, also referred to herein as the "phone home" process, may work as follows. At the factory, the networking device 750 is programmed with a list of DNS names for one or more heartbeat servers 710 on the Internet 720. The device 750 is also programmed with a unique PKI certificate which contains the unique serial number of the device 750. This certificate is signed by a private key only known to the device 750. The corresponding public key is stored on the heartbeat servers 710. The networking device 750 powers-on and gains an IP address via DHCP. In the DHCP response, the device 750 receives the address of one or more DNS servers. The networking device 750 automatically discovers all downstream devices 760. This may be accomplished by numerous methods, including scans of IP address ranges to determine which addresses respond, capturing packets promiscuously, inferring device type by Ethernet MAC address, port scans of devices found, etc. The networking device 750 simultaneously discovers all upstream devices 740 using methods similar to those for discovering downstream devices 760.

The networking device 750 packages all information discovered about the upstream and downstream devices 740 and 760. The device 750 attempts to open a SSL connection to the first heartbeat server 710 on the list programmed at the factory using the unique PKI certificate programmed on that particular device 750 at the factory. If a connection cannot be established with the first heartbeat server 710 on the list, the device 750 moves on to try the second heartbeat server 710 on the list. The process is repeated until a connection is established or the list is exhausted. In the event the list is exhausted without a connection successfully being formed, the device 750 starts again at the top of the list of heartbeat servers 710.

Using the connection established to heartbeat server 710, the networking device 750 sends the information it has collected about its upstream and downstream neighboring devices, 740 and 760, to the heartbeat server 710. Additionally, it sends any log entries and performance measurements collected since the last successful heartbeat. The heartbeat server 710 acknowledges receipt of this information, thus constituting a "successful heartbeat" and causing the device 750 to clear the record of the log entries and performance measurements just uploaded.

Using that same connection, the networking device 750 queries the heartbeat server 710 to determine the proper configuration the device 750 should be using. Each and every configuration is given a unique identifier which is returned as the result of this query. The device 750 compares the unique identifier with the identifier for the configuration it is actually using. If they differ, the device 750 separately initiates a secure download of the appropriate configuration from the heartbeat server 710. The filename for the configuration is the same as the unique identifier, for this implementation. Once downloaded, the device 750 switches to use that new configuration immediately. Using the same connection, the device 750 queries the heartbeat server 710 to determine the proper software version that the device 750 should be using. Each and every software image is given a unique identifier which is returned as the result of this query along with an effective date/time. The device 750 compares the unique identifier with the identifier for the software image it is actually using. If they differ, the device 750 separately initiates a slow, secure download of the appropriate configuration from the heartbeat server 710. The filename for the configuration is the same as the unique identifier. The transfer is measured and slow, with an intentional delay between the fetch of each block on the order of 1 second, so as to avoid saturating the limited link to the Internet. Once downloaded, the image is burned to the device's flash memory. Once the effective date/time is reached, the device 750 reboots into and runs the new software image.

The heartbeat process repeats, for example once every 1 minute. The same process takes place for all networking devices on the network. Note that the networking devices are remotely upgraded with no action taken by any user(s) connected to that device. On each heartbeat, each device compares its current software version to that advertised by the heartbeat server and if the software that the device is running is not the most recent advertised, it fetches newer software from the heartbeat server, stores it permanently in the device, and starts running it. Furthermore, note that the networking devices are conveying their log entries and monitored statistics to the Web service on each heartbeat. Centralizing the collection and storage of this data aids the customer in meeting government compliance and regulatory requirements, and frees them from implementing infrastructure to save this data on their own.

Phone Home for Device Configuration

Each networking device "phones home" on a periodic basis. Each such contact, initiated by the networking device is called a "heartbeat". When a device heartbeats to a heartbeat server on the Internet, it requests the unique identifier of the configuration that device should be running If the configuration the device is actually running differs, the device fetches that newer configuration and starts using it immediately.

Several "heartbeat servers" are implemented to ensure availability of one such server at all times. Each networking device is configured with a list of such heartbeat servers as part of their configuration. When a device is first installed on the network, it is programmed with a starting set of heartbeat servers to use in fetching its first configuration.

Networking devices have no local user interface to make configuration changes—all changes are made at the management station. Such changes made at the management station ultimately are propagated to the heartbeat servers.

Significant benefits of using techniques described in this paper over alternative approaches include the following. Since devices have no local user interfaces, their configuration settings do not diverge from those intended by the management station. Since each networking device is programmed at the factory with a starting list of heartbeat servers, no configuration of the networking device is required for it to get its first configuration settings.

Phone Home for Device Monitoring

Each networking device "phones home" on a periodic basis. Each such contact, initiated by the networking device is called a "heartbeat". When a device heartbeats to a heartbeat server on the Internet, it pushes all performance statistics and monitoring status to the management station as part of that heartbeat. See the related "Phone Home for Device Configuration" for more details of the heartbeat process.

Significant benefits of techniques described in this paper over alternative approaches include the following. Since the networking device initiates communication with the management station, this solution can traverse NAT. Note that the networking devices are conveying their log entries and monitored statistics to the Web service on each heartbeat. Centralizing the collection and storage of this data aids the customer in meeting government compliance and regulatory requirements, and frees them from implementing infrastructure to save this data on their own.

Phone Home for Software Distribution

Each networking device "phones home" on a periodic basis. Each such contact, initiated by the networking device is called a "heartbeat". When a device heartbeats to a heartbeat server on the Internet, it requests the unique identifier of the operational software that device should be running If the operational software the device is actually running differs, the device fetches that software and starts using it.

Several "heartbeat servers" are implemented to ensure availability of one such server at all times. Each networking device is configured with a list of such heartbeat servers as part of their configuration. When a device is first installed on the network, it is programmed with a starting set of heartbeat servers to use in updating its operational software the first time.

Significant benefits of techniques described in this paper over alternative approaches include the following. For each type of networking device there is exactly one and only one current version of its operational software. Network Administrators no longer need to be concerned about the multitude of possible software versions available for today's devices. This solution also has the advantage that even a device that has been held in a warehouse for many months after manufacture will be running the latest version of operational software upon the first heartbeat after being installed on the network, without the need for operator intervention. Note that the networking devices are remotely upgraded with no action taken by any user(s) connected to that device. On each heartbeat, each device compares its current software version to that advertised by the heartbeat server and if the software that the device is running is not the most recent advertised, it fetches newer software from the heartbeat server, stores it permanently in the device, and starts running it.

Zero-Touch Deployment via One-Time Password

Another component to a NaaS solution is the ability to deploy devices with no other configuration tasks expected of the end-user except to enter a one-time password. Networking device configuration is a function not of the serial number of the particular networking device per se, but rather is a function of the human that wishes to use the networking device to accomplish productive work. Unfortunately, most networking device configuration tools only configure devices as a function of the networking device's identity, not the end-user behind that device.

In embodiments, the networking device is shipped from the manufacturer directly to the end-user's location, without being "pre-configured" by the employee's IT staff. The end-user performs the following steps. The end-user unpacks the networking device. He connects the upstream port to the cable/DSL modem. He connects his PC/laptop to a downstream port. He powers-on the networking device and opens a Web browser on their PC/laptop. The networking device "captures" the end-user's HTML session and presents a screen asking the end-user for his one-time-password. The end-user enters the onetime password given to them by his IT staff. When the end-user was initially approved to receive a home networking device, the IT staff did the following: added the end-user's username to the network management system as an authorized user; put the end-user in the appropriate group of authorized end-users with similar business requirements; e-mailed the one-time password generated by the network management system to the end-user; when the networking device receives the one-time password, the device provides the password to the network management system, and receives a device configuration suitable to address the needs of the particular end-user.

In embodiments, the process for deployment of a networking device in a home office are as follows. The CPE is shipped from the manufacturer directly to the end-user. While it may often be the case that the CPE is actually sent to the customers' IT department for distribution to the end-users, this need not be assumed. Even when the device is sent to the customer's IT department, the initial deployment model does not require the IT department to perform any operation(s) on each and every individual CPE, as that would be far too onerous in large-scale deployments. The CPE is connected to up-stream devices and is powered-on. It is assumed that the end-user is savvy enough to connect the CPE to the up-stream device and power it on. LEDs may be used on the CPE to indicate a link for all Ethernet ports. All Ethernet ports should have auto-crossover circuitry in order to detect and connect the use of incorrect Ethernet cable types.

Once the CPE is connected and powered on, the CPE gets an IP address from an up-stream DHCP server. In the event there is no DHCP server, the CPE will default to 192.168.0.1 and intercept any HTML packets to a page served locally from the CPE that explains that the CPE was unable to get an address via DHCP along with some suggested steps for the end-user to try. The CPE collects information about its surroundings. The CPE will note which down-stream ports have links, and the information given it by the DHCP server, such as the address or addresses of the DNS server(s). The CPE will also note its firmware version(s) and hardware configuration information. The CPE will also start discovering other attributes of the local network including, for example: a) using a security scanner, such as nMap, to discover what types of devices and operating systems are connected to the CPE; b) a port scan of the discovered devices to identify which ports are operational; c) an attempt to attach to basic services of the discovered devices such as http, SMPT, printing, basic routing protocols (OSPF, BGP, etc); and d) scanning for existing wireless networks to identify SSID's, Security levels, etc. This data will be uploaded to the Web service and used to assist with site specific configuration settings and requirements.

The CPE contacts the NaaS management service. The CPE will have a certificate installed in its non-volatile RAM at time of manufacturing which contains the CPE's serial number. The CPE sends this certificate and the information about its surroundings to the NaaS management service. Assuming the certificate is found to be valid, all further communication from the CPE to the network management service will be in an encrypted SSL session. Network management service validates the certificate and checks the CPE firmware version. If the CPE's firmware is out of date, the response to the CPE indicates this fact which causes the CPE to securely download, burn and reboot into this new firmware version.

At this point the end-user is challenged for one-time credentials. Although, if the particular CPE had been pre-registered by the customer's IT department, this is skipped. At this point, the CPE does not have its policy. Once the end-user opens a Web browser on their downstream PC, any HTTP request is intercepted and redirected to the network management service. The end-user or authorized third party installer (i.e. FedEx delivery person) enters their one-time credentials, which may have been issued to them from an IT department. Note that using such one-time credentials allows the IT department to issue any CPE to the end-user without having to note which serial number was issued to which employee. It also allows the CPE to be "drop-shipped" directly from manufacturing to the end-user. Assuming the network management service validates the one-time credentials, the policy the IT department assigned to that end-user is associated with the CPE's serial number. The CPE requests a policy from the network management service. The CPE securely pulls its configuration/policy from the network management service, and reconfigures itself in accordance with that configuration/policy. Typically, creating one or more IPsec or SSL tunnels to the customer's hub device. On any successive power-ups, the CPE would already have an associated configuration/policy, and therefore would not require one-time credentials from the end-user.

The end user(s) must authenticate to the network. Just like a user would be prompted for a user credential to access the LAN or an SSL/IPSec Remote Access VPN. When the user attempts to connect to the network they will need to enter their security credentials before network access is granted.

Using this process, the end-user need not perform any configuration operations other than to simply enter a one-time-password. Furthermore, the employer need not stock and pre-configure the networking devices, but can simply instruct the vendor to ship units directly from their factory to the end-user's location.

CPE Authentication with no PSK on the CPE

Authenticating a device, a customer premises equipment (CPE), to a Web service typically involves some key material being pre-installed on the CPE, perhaps a certificate, or sometimes a pre-shared key (PSK). However, embodiments include a process to authenticate a CPE, to a Web service without having any PSK material on the CPE. This process permits secure authentication, authorization and accounting (AAA) of CPE using a secure Web service without storing a PSK on the CPE.

Figure 8:
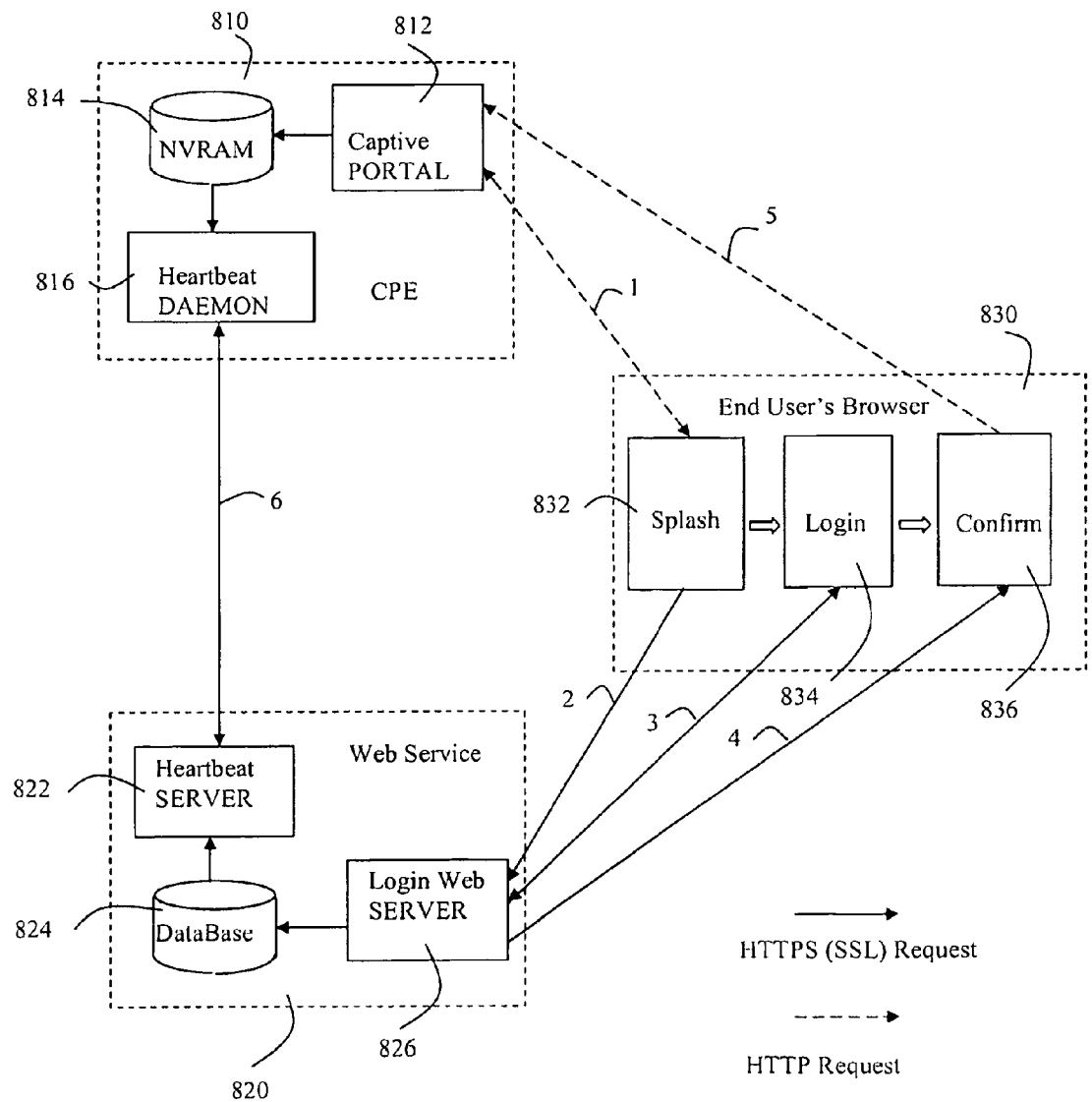
FIG. 8 illustrates authentication of client premises equipment to a Web service.

FIG. 8 illustrates the process of authentication of a CPE 810 to a Web service 820. Initially, a CPE 810 is totally locked down as a walled garden with access to only DNS and the Web service 820. The end user opens his browser 830 and makes any web request. See request 1. Captive portal software fields the request and sends a splash screen HTML response 832 that has a redirect to the HTTPS link to the Web service login server 826, with information in the redirect URL about the CPE 810, including information such as the CPE Mac Address, etc.

The end user's browser 830 performs the HTTPS redirect in the splash screen 832 that sends a request to the Web service's login Web server 826. See request 2. The login Web server 826 generates a short lived NONCE, and stores it associated with the remote CPE's MAC address in the database 824. A NONCE is a number used once, such as a random or pseudorandom number issues in an authentication protocol.

The login Web server responds with the login form 834. See request 3. The end user enters the device password, which in this example is a PSK that has been stored in the database entry associated with the device previously sent securely to the end user by an administrator. The login Web server 826 validates this password. If this process is successful then the process continues, otherwise the user is presented again with the login screen including an error message.

The login Web server responds to a correct password with a confirm page 836, placing a Javascript stub in the confirm page with the URL of the captive portal 812 and the generated NONCE. See request 4. The end user's web browser 830 displays the confirm 836, executes the Javascript that issues an HTTP (insecure) POST of the generated NONCE back to the captive portal 812 which stores it in non-volatile RAM (NVRAM) 814. See request 5.

Heart beat daemon 816 and heartbeat server 822 handshake over HTTPS (secure) connection. See request 6. Heartbeat daemon 816 sends the NONCE back to the heartbeat server 822 in the next scheduled heart beat cycle, before the NONCE expires, heartbeat server 822 validates the NONCE, looking it up by device MAC address in the database 824, and if valid it sends the MD5 hash of the user entered device password, or an equivalent cryptographic hash function. The heartbeat daemon 816 uses the MD5 hash of the device password as an authentication token for subsequent heartbeats.

Note that the network in FIG. 8 is equivalent to part of the network in FIG. 1, except that FIG. 8 provides more detail of the components involved in authentication of a networking device.

Although embodiment have been particularly described, it should be readily apparent to those of ordinary skill in the relevant art that changes and modifications in form and details may be made without departing from the spirit and scope of the disclosure. It is intended that the appended claims encompass such changes and modifications.

What is claimed is:

1. A method comprising:
   discovering local devices, network services, and an uplink carrier associated with a network;
   configuring the network using a business wizard and a library of network configurations;
   forming and maintaining the network as a secure network;
   monitoring networking devices of the network using a heartbeat process;
   auto-upgrading software implemented in the network;
   authenticating a networking device of the networking devices that does not have a pre-shared key to a Web service;
   receiving a Web request from a user associated with the Web service and the networking device;
   fielding the Web request at a captive portal, wherein the captive portal sends a splash screen HTML response that has a redirect to an HTTPS link to a Web service login server associated with the Web service with information in a redirect URL of the captive portal about the networking device, wherein the information includes a MAC address of the networking device;
   receiving a request at the Web service login server;
   generating a short-lived number used once (NONCE) and storing the short-lived NONCE in association with the MAC address at the Web service login server;
   sending from the Web service login server a login form, wherein the user is prompted to enter a device password into the form;
   validating the password at the Web service login server, wherein the Web service login server responds to a correct password with a confirmation page, placing a stub in the confirmation page with the redirect URL and the short-lived NONCE;
   receiving an HTTP POST of the generated NONCE at the captive portal;
   handshaking between a heartbeat daemon and a heartbeat server over HTTPS;
   receiving the NONCE at the heartbeat server in a next scheduled heartbeat cycle, before the NONCE expires, wherein the heartbeat server looks up the MAC address to validate the NONCE and, if valid, sends a cryptographic hash of the password;
   wherein the heartbeat daemon uses the cryptographic hash as an authentication token for subsequent heartbeats.

2. The method of claim 1, further comprising ensuring the networking devices are running one and only one version of networking software.

3. The method of claim 1, further comprising maintaining one version of software on a hub.

4. The method of claim 1, further comprising enabling modification of network as a service solutions at multiple system levels.

5. The method of claim 1, further comprising delivering network management applications as a multi-tenant hosted software as a service.

6. The method of claim 1, further comprising developing, designing, and delivering network management software applications from a multi-tenant software as a service model using Web services that are distributed across the Internet.

7. The method of claim 1, further comprising providing network management functions via one or more Web pages through which users can configure and monitor the networking devices.

8. The method of claim 7, further comprising providing re-configuration of the networking devices through a separate Web-based service.

9. The method of claim 7, further comprising providing performance statistics through a separate Web-based service.

10. The method of claim 7, further comprising serving Web pages from a Web user interface server in a stateless fashion to a user associated with management of the network.

11. The method of claim 1, further comprising:
    receiving at a heartbeat server periodically from a first networking device of the networking devices a packet including all logs since a last, acknowledged, heartbeat communication;
    responding with one packet containing a user ID of a latest configuration file that the first networking device should be running, and a build number of a software image that the first networking device should be running, wherein the response packet from the heartbeat server is implicitly an acknowledgement that the logs have been accepted so the networking device knows to purge applicable values from memory;
    wherein when the first networking device is not running the latest configuration file or the software image, the first networking device fetches the latest configuration file or the software image via a secure transport method.

12. The method of claim 1, further comprising:
    registering by a first networking device of the networking devices that the first networking device is running stale code;
    fetching by the first networking device a newer image, wherein a delay in fetching the newer image is added between each block fetched so as to not saturate a limited WAN link;
    burning the newer image into a memory partition on the first networking device for active software, wherein the memory partition does not hold a currently running stale image;
    rebooting the first networking device into the memory partition;

wherein if the newer image does not successfully receive a heartbeat reply in an amount of time after reboot, the first networking device reverts to the stale image.

13. The method of claim 1, further comprising:
receiving an instruction to publish a modified configuration through a Web page interface;
generating at a Web user interface server new configuration files for one or more of the networking devices;
copying the new configuration files to each of the servers where the new configuration files are stored in a short term monitoring database of the heartbeat server;
updating by the Web user interface server the short term monitoring database with a user ID associated with the new configuration files for each of the one or more of the networking devices;
wherein on a next heartbeat, the one or more of the networking devices receives the user ID for an applicable one of the new configuration files and, recognizing they have a stale configuration, fetches the applicable one of the new configuration files via a secure transport method.

14. The method of claim 13, further comprising distilling and pushing data to a long term database from the short term database.

15. The method of claim 1, wherein the cryptographic hash of the password is an MD5 hash or an equivalent cryptographic hash function.

16. The method of claim 15, further comprising locking down the networking device with access to only DNS and the Web service.

17. A system comprising:
at least one processor;
a memory storing instructions configured to instruct the at least one processor to perform:
discovering local devices, network services, and an uplink carrier associated with a network;
configuring the network using a business wizard and a library of network configurations;
forming and maintaining the network as a secure network;
monitoring networking devices of the network using a heartbeat process;
auto-upgrading software implemented in the network;
authenticating a networking device of the networking devices that does not have a pre-shared key to a Web service;
receiving a Web request from a user associated with the Web service and the networking device;
fielding the Web request at a captive portal, wherein the captive portal sends a splash screen HTML response that has a redirect to an HTTPS link to a Web service login server associated with the Web service with information in a redirect URL of the captive portal about the networking device, wherein the information includes a MAC address of the networking device;
receiving a request at the Web service login server;
generating a short-lived number used once (NONCE) and storing the short-lived NONCE in association with the MAC address at the Web service login server;
sending from the Web service login server a login form, wherein the user is prompted to enter a device password into the form;
validating the password at the Web service login server, wherein the Web service login server responds to a correct password with a confirmation page, placing a stub in the confirmation page with the redirect URL and the short-lived NONCE;
receiving an HTTP POST of the generated NONCE at the captive portal;
handshaking between a heartbeat daemon and a heartbeat server over HTTPS;
receiving the NONCE at the heartbeat server in a next scheduled heartbeat cycle, before the NONCE expires, wherein the heartbeat server looks up the MAC address to validate the NONCE and, if valid, sends a cryptographic hash of the password;
wherein the heartbeat daemon uses the cryptographic hash as an authentication token for subsequent heartbeats.

18. The system of claim 17, wherein the instructions further instruct the at least one processor to perform delivering network management applications as a multi-tenant hosted software as a service.

19. The system of claim 17, wherein the cryptographic hash of the password is an MD5 hash or an equivalent cryptographic hash function.

* * * * *